(12) United States Patent
Beiu

(10) Patent No.: US 6,438,572 B1
(45) Date of Patent: Aug. 20, 2002

(54) ADDER HAVING REDUCED NUMBER OF INTERNAL LAYERS AND METHOD OF OPERATION THEREOF

(75) Inventor: Valeriu Beiu, Dallas, TX (US)

(73) Assignee: RN2R, L.L.C., Dallas, TX (US)

( * ) Notice: Subject to any disclaimer, the term of this patent is extended or adjusted under 35 U.S.C. 154(b) by 0 days.

(21) Appl. No.: 09/407,598

(22) Filed: Sep. 28, 1999

Related U.S. Application Data (63) Continuation-in-part of application No. 09/158,947, filed on Sep. 21, 1998, now Pat. No. 6,205,458.

(51) Int. Cl.$^7$ .................................................. G06F 7/52
(52) U.S. Cl. ........................................ 708/713; 708/710
(58) Field of Search ................................ 708/713, 710, 708/711, 712

(56) References Cited

U.S. PATENT DOCUMENTS

| | | | |
|---|---|---|---|
| 3,275,812 A | 9/1966 | Coates, Jr. et al. ......... 235/173 |
| 3,534,404 A | 10/1970 | Hanson ..................... 235/177 |
| 5,016,211 A | 5/1991 | Jeong ........................ 364/786 |
| 5,027,312 A | 6/1991 | Knauer et al. ............. 364/788 |
| 5,034,918 A | 7/1991 | Jeong ......................... 365/49 |
| 5,086,405 A | 2/1992 | Chung et al. .............. 364/748 |
| 5,095,457 A | 3/1992 | Jeong ........................ 364/758 |
| 5,095,458 A | 3/1992 | Lynch et al. .............. 364/787 |
| 5,136,539 A | 8/1992 | Kumar ....................... 364/787 |
| 5,163,020 A | 11/1992 | Chau ......................... 364/788 |
| 5,251,164 A | * 10/1993 | Dodson et al. ............ 708/713 |
| 5,272,662 A | 12/1993 | Scriber et al. ............. 364/788 |
| 5,278,783 A | 1/1994 | Edmondson ............... 364/786 |
| 5,477,480 A | 12/1995 | Inui ........................... 364/787 |
| 5,479,356 A | * 12/1995 | Shackleford et al. ....... 708/713 |
| 5,497,343 A | 3/1996 | Rarick ....................... 364/787 |
| 5,579,254 A | 11/1996 | Kumar et al. .............. 364/788 |
| 5,581,497 A | 12/1996 | Kumar ....................... 364/787 |
| 5,631,860 A | 5/1997 | Morinaka ................... 364/787 |
| 5,636,156 A | 6/1997 | Mikan, Jr. et al. ......... 364/787 |
| 5,636,157 A | 6/1997 | Hesson et al. ............. 364/788 |
| 5,701,504 A | 12/1997 | Timko ....................... 395/800 |
| 5,852,568 A | 12/1998 | Ranjan ...................... 364/788 |
| 5,943,251 A | * 8/1999 | Jiang et al. ................ 708/713 |
| 5,990,709 A | 11/1999 | Thewes et al. ............. 327/89 |
| 5,991,789 A | 11/1999 | Prange et al. .............. 708/625 |
| 6,292,818 B1 | * 9/2001 | Winters ..................... 708/713 |

OTHER PUBLICATIONS

"A Regular Layout for Parallel Adders" by Richard P. Brent H. T. Kung; 1982 IEEE; pp. 260–264.

"VLSI Design of High–Speed, Low–Area Addition Circuitry" by Tackson Han, David A. Carlson, and Steven P. Levitan; Oct. 5, 1987; IEEE; pp. 418–422.

"Threshold Carry Look–Ahead for Parallel Binary Adder" by M. Schmookler; IBM Technical Disclosure Bulletin; Nov. 6, 1964; pp. 451–452.

* cited by examiner

*Primary Examiner*—David H. Malzahn

(57) ABSTRACT

An adder, a processor (such as a microprocessor or digital signal processor), and methods of adding in such adder or processor. In one embodiment, the adder includes: (1) a first and second units in a first logic layer, the first unit receiving first and second addend and augend bits and generating therefrom a first single group-carry-generate bit and first and second carry-propagate bits, the second unit receiving third and fourth addend and augend bits and generating therefrom a second single group-carry-generate bit and third and fourth carry-propagate bits and (2) a third unit in a second logic layer, coupled to the first and second units, that receives the first and second single group-carry-generate bits and the first, second, third and fourth carry-propagate bits and generates therefrom resulting group-carry-generate and group-carry-propagate bits.

35 Claims, 4 Drawing Sheets

ADDER HAVING REDUCED NUMBER OF INTERNAL LAYERS AND METHOD OF OPERATION THEREOF

CROSS-REFERENCE TO RELATED APPLICATIONS

This application is a continuation-in-part of U.S. patent application Ser. No. 09/158,947 ('947 application), now U.S. Pat. No. 6,205,458 entitled "ADDER AND MULTIPLIER CIRCUITS EMPLOYING LOGIC GATES HAVING DISCRETE, WEIGHTED INPUTS AND METHODS OF PERFORMING COMBINATORIAL OPERATIONS THEREWITH," to Valeriu Beiu, filed on Sep. 21, 1998. This application is related to the following U.S. Patent Applications:

| Serial No | Title | Inventor | Date |
|---|---|---|---|
| 09/392,811 | Conductance-based Logic Gate and Methods of Operation and Manufacturing Thereof | Beiu | Filed Sept. 9, 1999 |
| 09/406,367 | Noise Tolerant Conductance-based Logic Gate and Methods of Operation and Manufacturing Thereof | Beiu | Filed Sept. 28, 1999 |

The above-listed applications are commonly assigned with the present invention and are incorporated herein by reference as if reproduced herein in their entirety.

TECHNICAL FIELD OF THE INVENTION

The present invention is directed, in general, to logic gates and, more specifically, to an adder having a reduced number of internal layers and method of operation thereof.

BACKGROUND OF THE INVENTION

Digital systems are used extensively in computation and data processing, controls, communications and measurement. Digital systems use digital signals that may only assume discrete values. Typically, digital systems use binary signals that employ only two values. Since such systems only use two distinct values, errors caused by component variations are minimized. As a result, a digital system may be designed such that, for a given input, an output thereof is exactly correct and repeatable. This gives rise to the extreme accuracy for which digital systems are well known.

Analog systems, on the other hand, use analog signals that vary continuously over a specified range. Analog systems are thus particularly vulnerable to error, depending on the accuracy of the components used therein. Since digital systems are generally capable of greater accuracy and reliability than analog systems, many tasks formerly performed by analog systems are now performed exclusively by digital systems.

One basic building block of digital systems is a logic gate. Conventional logic gates have one output and one or more inputs. The number of inputs is called the "fan-in" of the gate. The state of the output is completely determined by the state(s) of the input(s). Conventional logic gates are typically created by coupling a number of transistors together to perform a Boolean function (e.g., AND, OR, NOT). The logic gates are then coupled together to form a multi-layer circuit that is capable of performing logical functions (e.g., arithmetic functions).

The maximum number of gates cascaded in series between the input and the output of such a circuit is typically referred to as the number of layers of gates. Designers are concerned with the number of layers in a circuit for several reasons. In some applications, increasing the number of layers may reduce the required number of gates and/or gate inputs (i.e., fan-in), thus reducing the cost (which may be expressed in terms of integrated circuit area) of building the multi-layer circuit. Of course, cascading a larger number of gates together may result in unacceptable input-output delays and data dependency conditions. When the input of a gate is switched, a finite time elapses before the output of the gate changes. If a large number of gates are cascaded together to form a circuit, the time between an input change and a corresponding change in the output of the circuit may become excessive, thereby slowing down the operation of the multi-layer circuit.

Arithmetic functions are particularly susceptible to the effects of cascaded gates. The serial solution for binary addition is given here as an example. Initially, a first augend bit and a first addend bit are combined to produce a first sum bit and a first carry bit. The first carry bit is then combined with the second augend and addend bits to produce the second sum and carry bits. Since the second sum bit is dependent on the value of the first carry bit, the second sum bit cannot be computed before the first carry bit is computed. While each input-output delay is small, the cumulative input-output delay perceived when adding large numbers, due to the propagation of the carry bits, is, in the worst case, proportional to the number of bits added, and may be prohibitive. Techniques (e.g., carry look-ahead, conditional sum) have been developed to reduce the delay to a logarithmic function of the number of input bits to be added. The number of Boolean gates (e.g., AND, OR, NOT) used by such techniques is in the range of 8n to 35n, or 2n log(n) to 3n log(n), where n is the number of bits to be added and the logarithms are base two.

Increasing processing power is a continuing goal in the development of processors such as microprocessors or digital signal processors (DSPs). Processor designers are generally familiar with three ways to increase the processing power of a central processing unit (CPU). The CPU's clock frequency may be increased so that the CPU can perform a greater number of operations in a given time period. Processors are designed to operate at increasingly high clock frequencies. While a higher clock frequency generally results in increased processing power, the higher clock frequency also increases power dissipation, resulting in higher device operating temperatures. Processor designers, therefore, must address these additional problems to avoid catastrophic device failures.

Another way to increase processing power is to increase input and output data bus width, thereby allowing the CPU to process a greater amount of code and data. Early processors were packaged using dual in-line packaging (DIP) technology. Increasing the width of the data buses was both expensive and unrealistic, often resulting in extremely large device packages. Today, with the use of pin grid array (PGA) packaging, increasing the size of the data buses no longer poses a packaging problem. Of course, a larger number of transistors is required to process the additional information conveyed by the wider data buses.

Yet another way to increase processing power is to change the internal architecture of the processor to overlap the execution of instructions by, for example, superscaling. This method also requires the addition of a large number of transistors, since entire processing stages or execution units must be duplicated. Performing a large number of instructions in parallel may also result in data dependency problems.

Another way to increase processing power is to reduce the number of layers of logic gates in multi-layer circuits such as adders and multipliers. However, reducing the number of layers requires increasing the number of gate inputs. Accordingly, what is needed in the art is a way to increase a processor's processing power by reducing the number of layers of logic gates while maintaining a reduced number of gates and gate inputs.

SUMMARY OF THE INVENTION

To address the above-discussed deficiencies of the prior art, the present invention provides an adder, a processor (such as a microprocessor or digital signal processor), and methods of adding in such adder or processor. In one embodiment, the adder includes: (1) a first and second units in a first logic layer, the first unit receiving first and second addend and augend bits and generating therefrom a first single group-carry-generate bit and first and second carry-propagate bits, the second unit receiving third and fourth addend and augend bits and generating therefrom a second single group-carry-generate bit and third and fourth carry-propagate bits and (2) a third unit in a second logic layer, coupled to the first and second units, that receives the first and second single group-carry-generate bits and the first, second, third and fourth carry-propagate bits and generates therefrom resulting group-carry-generate and group-carry-propagate bits.

The present invention therefore introduces the broad concept of employing logic gates having more than two inputs to process the initial addend and augend and subsequent carry propagate and generate bits more comprehensively thereby to reduce the number of layers an adder of a given width requires. Since the speed of an adder is a function of the number of layers in the adder, a reduction in layer number should serve to increase the speed of the adder, perhaps dramatically.

In one embodiment of the present invention, the first unit comprises a first logic gate that receives the first and second addend and augend bits and generates therefrom the first single group-carry-generate bit and the second unit comprises a second logic gate that receives the third and fourth addend and augend bits and generates therefrom the second single group-carry-generate bit. In a more specific embodiment, the first and second logic gates are threshold gates. In another, more specific embodiment, the first unit comprises first and second OR gates that receive the first and second addend and augend bits and generate therefrom the first and second carry-propagate bits and the second unit comprises third and fourth OR gates that receive the third and fourth addend and augend bits and generate therefrom the third and fourth carry-propagate bits.

In one embodiment of the present invention, the third unit comprises a third logic gate that receives the first and second single group-carry-generate bits and the third and fourth carry-propagate bits and generates therefrom the resulting group-carry-generate bit. In a more specific embodiment, the third logic gate is a threshold gate. In another, more specific embodiment, the third unit comprises an AND gate that receives the first, second, third and fourth carry-propagate bits and generates therefrom the resulting group-carry-propagate bit.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
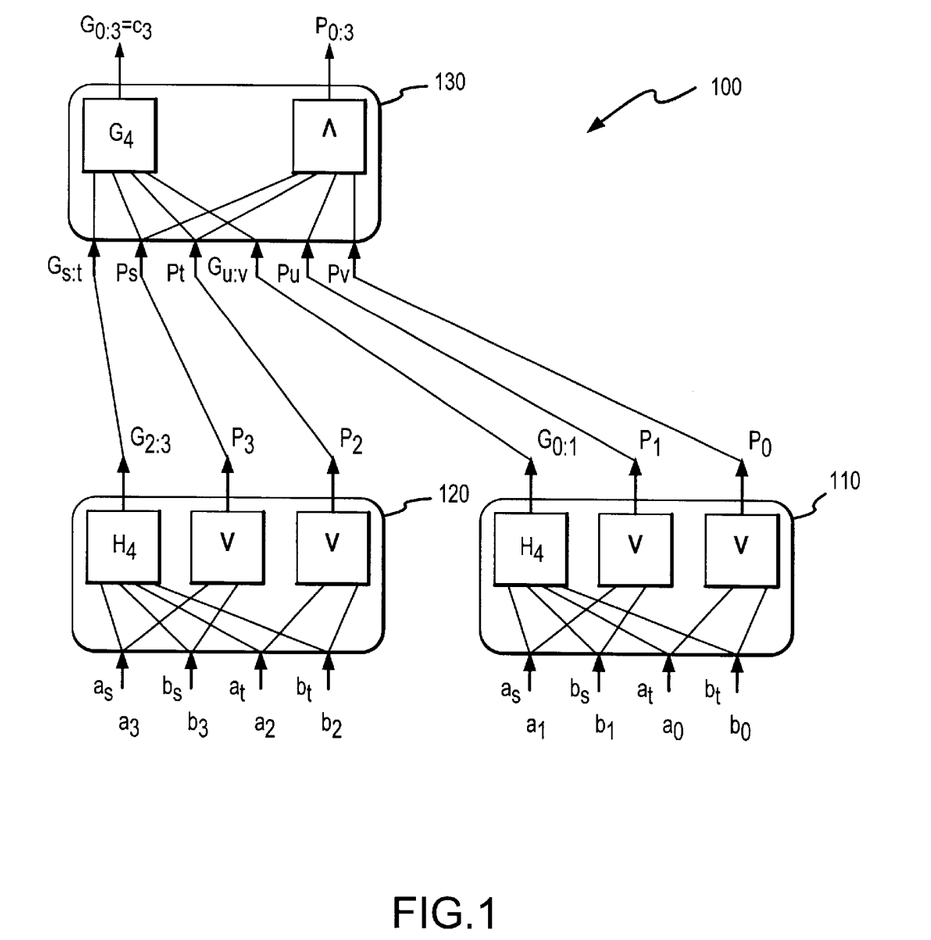
FIG. 1 illustrates a block diagram of part of an adder constructed in accordance with the principles of the present invention.

Referring initially to FIG. 1, illustrated is a block diagram of part of an adder constructed in accordance with the principles of the present invention, generally designated 100. The part of adder 100 comprises two logic layers. The first logic layer comprises a first unit 110 and a second unit 120. The first unit 110 comprises two OR functions ("∨") and a Boolean $H_4$ function. The $H_4$ function is:

$$H_4 = (a_s \wedge b_s) \vee [(a_s \vee b_s) \vee a_t b_t]$$

where "∨" represents a logical OR function and a "∧" represents a logical AND function. The $H_4$ function is linearly separable and therefore may also be represented as:

$$H_4 = sgn(2 \cdot a_s + 2 \cdot b_s + 1 \cdot a_t + 1 \cdot b_t - 3.5)$$

See the '007 application for more information on the $H_4$ function. The first unit 110 receives a first and second addend and augend bits $a_0$, $a_1$, $a_0$, $b_1$ and generates a first single group-carry-generate bit $G_{0:1}$ and a first and second carry-propagate bits $p_0$, $p_1$.

The second unit 120 comprises two OR functions ("∨") and an $H_4$ function. The second unit 120 receives a third and fourth addend and augend bits $a_2$, $a_3$, $b_2$, $b_3$ and generates a second single group-carry-generate bit $G_{2:3}$ and a third and fourth carry-propagate bits $p_2$, $p_3$.

The second logic layer comprises a third unit 130. The third unit 130 is coupled to the first unit 110 and the second unit 120. The third unit 130 comprises an AND function ("∧") and a $G_4$ function. The $G_4$ function is:

$$G_4 = G_{s:t} \vee (p_s \wedge p_t \wedge G_{u:v})$$

where "∨" represents a logical OR function and a "∨" represents a logical AND function. The $G_4$ function is linearly separable and therefore may be represented as:

$$G_4 = sgn(3 \cdot G_{s:t} + 1 \cdot p_s + 1 \cdot p_t + 1 \cdot G_{u:v} - 2.5)$$

See the '006 application and the '947 application for more information on threshold gates. The third unit 130 receives the first and second group-carry-generate bits $G_{0:1}$, $G_{2:3}$ and the first, second, third and fourth carry-propagate bits $p_0$, $p_1$, $p_2$, $p_3$. The third unit 130 generates a resulting group-carry-generate bit $G_{0:3}$ and a resulting group-carry-propagate bit $p_{0:3}$.

In an alternate embodiment of the present invention, the third unit 130 comprises a threshold gate. In a second embodiment of the present invention, the first unit 110, the second unit 120 and the third unit 130 comprise a threshold gate. See the '947 application for more information on threshold gates.

In one embodiment of the present invention, the adder 100 is part of a processor that comprises a memory, a control unit and an execution unit. The control unit and the execution unit are coupled to the memory and communicate data. The execution unit is also coupled to the control unit and receives direction from the control unit. Those skilled in the art are familiar with processors, memory, control units and execution units and their workings. In another embodiment of the present invention, the adder 100 is part of the execution unit. In a third embodiment of the present invention, the adder 100 is part of the control unit. In other embodiments of the present invention, any number of adders may be used inside a processor.

Those skilled in the art should note that the present invention is not restricted to use of the functions listed above. In other embodiments of the present invention, any type of function or logic gate built in accordance with the principles of this invention or the inventions incorporated by reference may be used in any of the units 110, 120, 130. Also, other embodiments of the present invention may contain more or fewer functional capabilities then described above.

Figure 2:
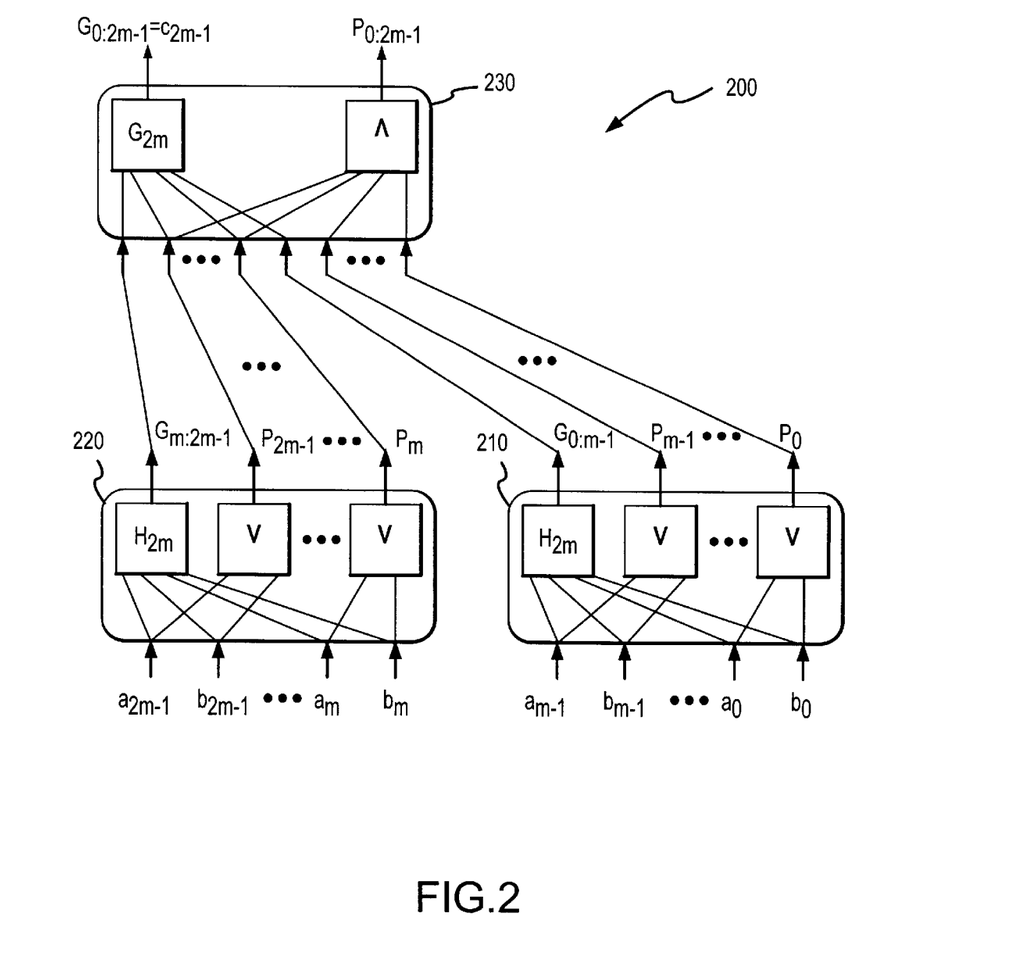
FIG. 2 illustrates a block diagram of part of an adder with larger fan-in gates constructed in accordance with the principles of the present invention.

Turning now to FIG. 2, illustrated is a block diagram of part of an adder with larger fan-in gates constructed in accordance with the principles of the present invention, generally designated 200. In the illustrated embodiment of the present invention, the part of adder with larger fan-in gates 200 comprises two logic layers. The first logic layer comprises a first unit 210 and a second unit 220. The first unit 210 comprises at least two OR functions ("∨") and a Boolean function $H_{2m}$. The $H_{2m}$ function is the $H_4$ modified to accommodate any even number of addends and augends. The $H_{2m}$ function is represented as:

$$H_{2m}=(a_{m-1} \wedge b_{m-1}) \vee [(a_{m-1} \vee b_{m-1}) \wedge a_{m-2} \wedge b_{m-2} \vee \ldots \vee [(a_{m-1} \vee b_{m-1}) \ldots (a_1 \vee b_1) \wedge a_0 \wedge b_0]$$

where "∨" represents a logical OR function and a "∧" represents a logical AND function. The $H_{2m}$ function is linearly separable and therefore may be represented as:

$$H_{2m}=sgn[2^{m-1} \cdot a_{m-1}+2^{m-1} \cdot b_{m-1}+2^{m-2} \cdot a_{m-2}+2^{m-2} \cdot b_{m-2}+ \ldots + 2^0 \cdot a_0+2^0 \cdot b_0-(2^m-0.5)]$$

See the '007 application for more information on the $H_4$ and the $H_{2m}$ functions. The first unit 210 receives addend and augend bits $a_0, \ldots, a_{m-1}, b_0, \ldots, b_{m-1}$ and generates a first single group-carry-generate bit $G_{0:m-1}$ and carry-propagate bits $p_0, \ldots, p_{m-1}$.

The second unit 220 comprises at least two OR functions ("∨") and an $H_{2m}$ function. The second unit 220 receives addend and augend bits $a_m, \ldots, a_{2m-1}, b_m, \ldots, b_{2m-1}$ and generates a second single group-carry-generate bit $G_{m:2m-1}$ and carry-propagate bits $p_m, \ldots, p_{2m-1}$.

The second logic layer comprises a third unit 230. The third unit 230 is coupled to the first unit 210 and the second unit 220. The third unit 230 comprises an AND function ("∨") and a $G_{2m}$ function. The $G_{2m}$ function is the $G_4$ modified to accommodate any even number of addends and augends. The $G_{2m}$ function is represented as:

$$G_{2m}=G_{m:2m-1} \wedge (p_{2m-1} \vee \ldots \wedge p_{2m-2} \vee \ldots \vee p_m \vee G_{0:m-1})$$

where "∧" represents a logical OR function and a "∨" represents a logical AND function. The $G_{2m}$ function is linearly separable and therefore may be represented as:

$$G_{2m}=sgn[(m+1)G_{m:2m-1}+p_{2m-1}+p_{2m-2}+ \ldots +p_m+G_{0:m-1}-(m+1-0.5)]$$

See the '006 application and the '947 application for more information on such logic gates. The third unit 230 receives the first and second group-carry-generate bits $G_{0:m-1}$, $G_{m:2m-1}$ and the carry-propagate bits $p_0, \ldots p_{2m-1}$. The third unit 230 generates a resulting group-carry-generate bit $G_{0:2m-1}$ and a resulting group-carry-propagate bit $p_{0:2m-1}$.

In an alternate embodiment of the present invention, the third unit 230 comprises a threshold gate. In a second embodiment of the present invention, any one or all of the units 210, 220, 230 comprise a threshold gate. See the '947 application for more information on threshold gates.

Those skilled in the art should note that the present invention is not restricted to use of the functions listed above. In other embodiments of the present invention, any type of function or logic gate built in accordance with the principles of this invention or the inventions incorporated by reference may be used in any of the units 210, 220, 230. Also, other embodiments of the present invention may contain more or fewer functional capabilities then described above.

Figure 3:
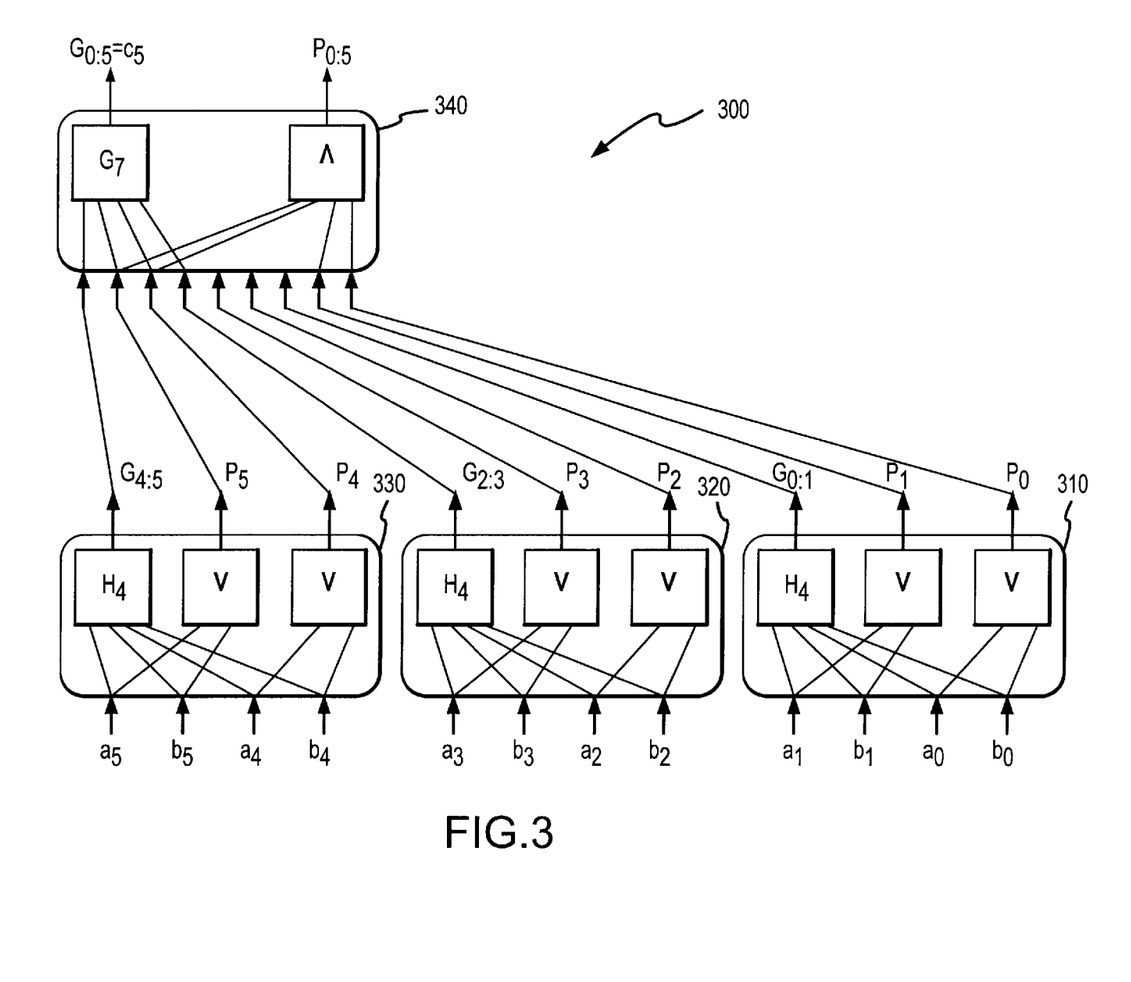
FIG. 3 illustrates a block diagram of part of an adder with 3 first layer logic gates constructed in accordance with the principles of the present invention.

Turning now to FIG. 3, illustrated is a block diagram of part of an adder with 3 first layer logic gates constructed in accordance with the principles of the present invention, generally designated 300. The part of adder 300 comprises two logic layers. The first logic layer comprises a first unit 310, a second unit 320 and a third unit 330. The first unit 310 comprises two OR functions ("∧") and a Boolean $H_4$ function.

The first unit 310 (analogous to the first unit 110 of FIG. 1) receives a first and second addend and augend bits $a_0, a_1, b_0, b_1$ and generates a first single group-carry-generate bit $G_{0:1}$ and a first and second carry-propagate bits $p_0, p_1$.

The second unit 320 (analogous to the second unit 120 of FIG. 1) comprises two OR functions ("∨") and an $H_4$ function. The second unit 320 receives a third and fourth addend and augend bits $a_2, a_3, b_2, b_3$ and generates a second single group-carry-generate bit $G_{2:3}$ and a third and fourth carry-propagate bits $p_2, p_3$.

The third unit 330 (analogous to either of the first unit 110 or the second unit 120 of FIG. 1) comprises two OR functions ("∨") and an $H_4$ function. The third unit 330 receives a fifth and sixth addend and augend bits $a_4, a_5, b_4, b_5$ and generates a third single group-carry-generate bit $G_{4:5}$ and a third and fourth carry-propagate bits $p_4, p_5$.

The second logic layer comprises a fourth unit 340. The third unit 340 is coupled to the first unit 310, the second unit 320 and the third unit 330. The fourth unit 340 comprises an AND function ("∧") and a $G_7$ function. The $G_7$ function is:

$$G_7=G_{i:i+1} \vee (p_i \wedge p_{i+1} \wedge G_{i+2:i+3}) \vee (p_i \wedge p_{i+1} \wedge p_{i+2} \wedge p_{i+3} \wedge G_{i+4:i+5})$$

where "∨" represents a logical OR function and a "∧" represents a logical AND function. The $G_7$ function is linearly separable and therefore may be represented as:

$$G_7=sgn(5 \cdot G_{i+4:i+5}+3 \cdot G_{i+2:i+3}+1 \cdot G_{i:i+1}+1 \cdot p_{i+5}+1 \cdot p_{i+4}+1 \cdot p_{i+3}+1 \cdot p_{i+2}-4.5)$$

See the '006 application and the '947 application for more information on such logic gates. The fourth unit 340 receives the first, second and third group-carry-generate bits $G_{0:1}$, $G_{2:3}$, $G_{4:5}$ and the first, second, third, fourth, fifth and sixth carry-propagate bits $p_0$, $p_1$, $p_2$, $p_3$, $p_4$, $p_5$. The fourth unit 340 generates a resulting group-carry-generate bit $G_{0:5}$ and a resulting group-carry-propagate bit $p_{0:5}$.

In an alternate embodiment of the present invention, the fourth unit 340 comprises a threshold gate. In a second embodiment of the present invention, the first unit 310, the second unit 320, the third unit 330 and the fourth unit 340 comprise a threshold gate. See the '947 application for more information on threshold gates.

Those skilled in the art should note that the present invention is not restricted to use of the functions listed above. In other embodiments of the present invention, any type of function or logic gate built in accordance with the principles of this invention or the inventions incorporated by reference may be used in any of the units 310, 320, 330, 340. Also, other embodiments of the present invention may contain more or fewer functional capabilities then described above.

Figure 4:
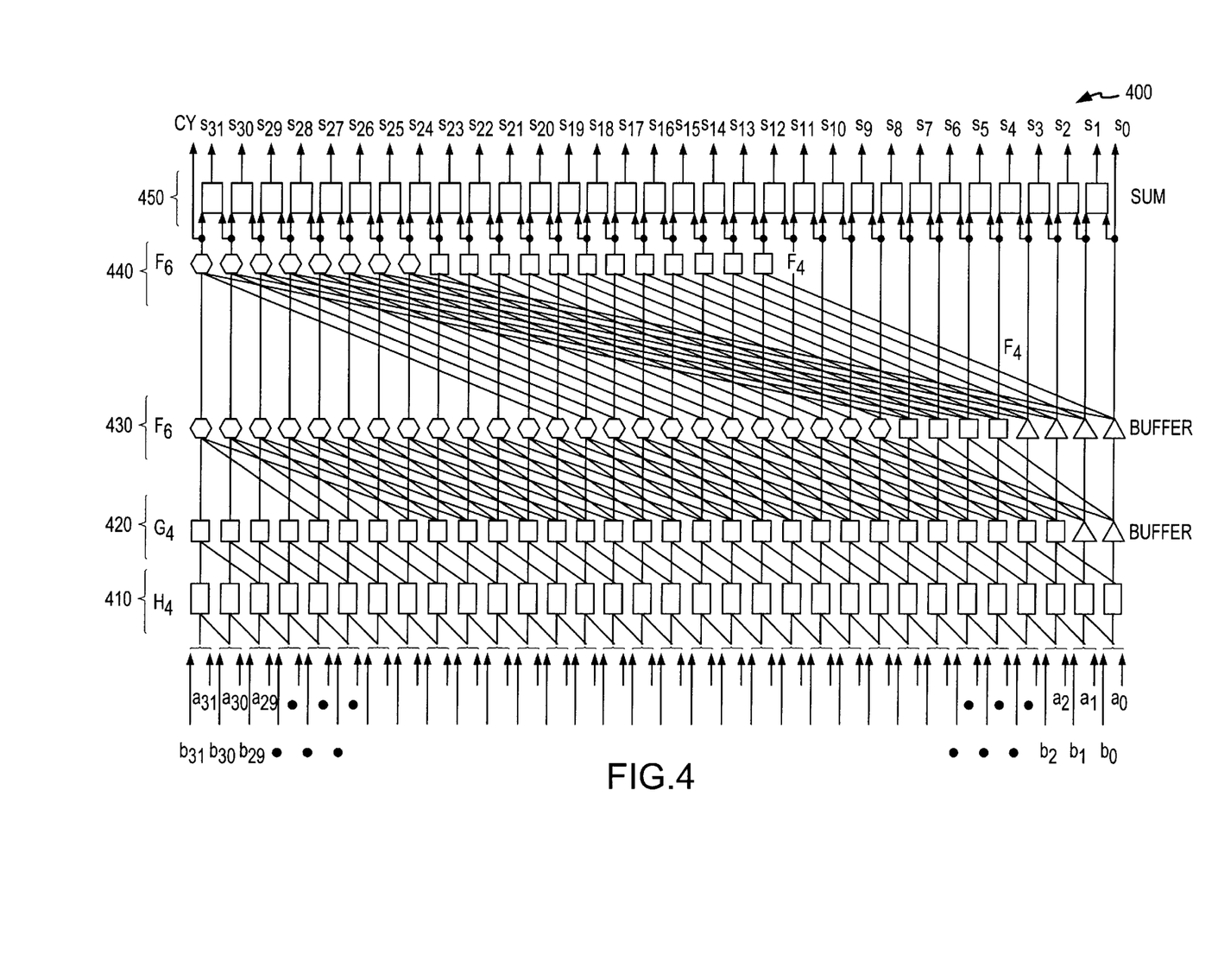
FIG. 4 illustrates a 32-bit adder using logic gates constructed in accordance with the principles of the present invention.

Turning now to FIG. 4, illustrated is a 32-bit adder using logic gates constructed in accordance with the principles of the present invention, generally designated 400. In the illustrated embodiment, the 32-bit adder 400 comprises five logic layers. The first layer 410 comprises logic units containing $H_4$ functions. The first layer 410 receives 32 addends and augends bits and generates group-carry-generate and carry-propagate bits.

The second logic layer 420 comprises logic units containing $G_4$ functions and buffers. The $G_4$ function is:

$$G_4 = G_{i+2:i+3} \vee (p_{i+3} \wedge p_{i+2} \wedge G_{i:i+1})$$

where "$\vee$" represents a logical OR function and a "$\wedge$" represents a logical AND function. The second logic layer 420 is coupled to the first logic layer 410 and receives the group-carry-generate and carry-propagate bits generated from the first logic layer 410. The second logic layer 420 produces resulting group-carry-generate and resulting group-carry-propagate bits.

The third logic layer 430 comprises logic units containing $F_6$ functions and AND (fan-in=3), logic units containing $F_4$ functions and AND (fan-in=2), and buffers. The $F_6$ function is:

$$F_6 = g_i \vee (p_i \wedge g_{i-1}) \vee (p \wedge p_{i-1} \vee g_{i-2})$$

where "$\vee$" represents a logical OR function and a "$\vee$" represents a logical AND function. The $F_6$ function is linearly separable and therefore may be represented as:

$$F_6 = sgn(5 \cdot g_i + 3 \cdot p_i + 2 \cdot g_{i-1} + 1 \cdot p_{i-1} + 1 \cdot g_{i-2} - 4.5)$$

The $F_4$ function is:

$$F_4 = g_i \vee (p_i \wedge g_{i-1})$$

where "$\vee$" represents a logical OR function and a "$\wedge$" represents a logical AND function. The $F_4$ function is linearly separable and therefore may be represented as:

$$F_4 = sgn(2 \cdot g_i + 1 \cdot p_i + 1 \cdot g_{i-1} - 1.5).$$

The third logic layer 430 receives the group-carry-generate and group-carry-propagate bits from the second logic layer 420 and produces resulting group-carry-generate and resulting group-carry-propagate bits.

The fourth logic layer 440 comprises logic units containing $F_6$ functions and AND (fan-in=3), and logic units containing $F_4$ functions and AND (fan-in=2). The fourth logic layer 440 is coupled to the third logic layer 430 and receives the group-carry-generate and group-carry-propagate bits from the third logic layer 430. The fourth logic layer 440 produces the final group-carry-generate and group-carry-propagate bits.

The fifth logic layer 450 comprises summing gates to produce the final result of the adder 400. The summing gates' function is:

$$S_i(a_i, b_i, c_i, c_{i-1}) = (a_i \wedge c_{i-1}) \vee [c_i' \wedge (a_i \vee b_i \vee c_{i-1})]$$

where "$\vee$" represents a logical OR function and a "$\wedge$" represents a logical AND function. The summing gates' function is linearly separable and therefore may be represented as:

$$S_i(a_i, b_i, c_i, c_{i-1}) = sgn(a_i + b_i + c_{i-1} + 2c_i' - 2.5)$$

where $a_i$ and $b_i$ are input addend and augend bits, and $c_i$ and $c_{i-1}$ are carry bits at position i ($c_i = G_{0:i}$). Of course, other implementations of the summing gate based on exclusive-OR (XOR) functions are well within the broad scope of the present invention.

Those skilled in the art should note that the 32-bit adder 400 is not restricted to use of the functions listed above. In other embodiments of the present invention, any type of function or logic gate built in accordance with the principles of this invention or the inventions incorporated by reference may be used in any of the logic layers. Also, other embodiments of the present invention may contain more or fewer functional capabilities then described above.

Although the present invention has been described in detail, those skilled in the art should understand that they can make various changes, substitutions and alterations herein without departing from the spirit and scope of the invention in its broadest form.

What is claimed is:

1. An adder, comprising:
   first and second units in a first logic layer, said first unit receiving first and second addend and augend bits and generating therefrom a first single group-carry-generate bit and first and second carry-propagate bits, said second unit receiving third and fourth addend and augend bits and generating therefrom a second single group-carry-generate bit and third and fourth carry-propagate bits; and
   a third unit in a second logic layer, coupled to said first and second units, that receives said first and second single group-carry-generate bits and said first, second, third and fourth carry-propagate bits and generates therefrom resulting group-carry-generate and group-carry-propagate bits.

2. The adder as recited in claim 1 wherein said first unit comprises a first logic gate that receives said first and second addend and augend bits and generates therefrom said first single group-carry-generate bit and said second unit comprises a second logic gate that receives said third and fourth addend and augend bits and generates therefrom said second single group-carry-generate bit.

3. The adder as recited in claim 2 wherein said first and second logic gates are threshold gates.

4. The adder as recited in claim 1 wherein said first unit comprises first and second OR gates that receive said first and second addend and augend bits and generate therefrom said first and second carry-propagate bits and said second unit comprises third and fourth OR gates that receive said third and fourth addend and augend bits and generate therefrom said third and fourth carry-propagate bits.

5. The adder as recited in claim 1 wherein said third unit comprises a third logic gate that receives said first and second single group-carry-generate bits and said third and fourth carry-propagate bits and generates therefrom said resulting group-carry-generate bit.

6. The adder as recited in claim 5 wherein said third logic gate is a threshold gate.

7. The adder as recited in claim 1 wherein said third unit comprises an AND gate that receives said first, second, third and fourth carry-propagate bits and generates therefrom said resulting group-carry-propagate bit.

8. A method of adding first and second addend and augend bits, comprising:
  (a) generating a first single group-carry-generate bit and first and second carry-propagate bits from said first and second addend and augend bits;
  (b) generating a second single group-carry-generate bit and third and fourth carry-propagate bits from said third and fourth addend and augend bits; and
  (c) generating resulting group-carry-generate and group-carry-propagate bits from said first and second single group-carry-generate bits and said first, second, third and fourth carry-propagate bits.

9. The method as recited in claim 8 wherein said (a) comprises generating said first single group-carry-generate bit from said first and second addend and augend bits and said (b) comprises generating said second single group-carry-generate bit from said third and fourth addend and augend bits.

10. The method as recited in claim 9 wherein said (a) and said (b) are carried out at least in part in threshold gates.

11. The method as recited in claim 8 wherein said (a) comprises generating said first and second carry-propagate bits from said first and second addend and augend bits and said (b) comprises generating said third and fourth carry-propagate bits from said third and fourth addend and augend bits.

12. The method as recited in claim 8 wherein said (c) comprises generating said resulting group-carry-generate bit from said first and second single group-carry-generate bits and said third and fourth carry-propagate bits.

13. The method as recited in claim 12 wherein said (c) is carried out at least in part in a threshold gate.

14. The method as recited in claim 8 wherein said (c) comprises generating said resulting group-carry-propagate bit from said first, second, third and fourth carry-propagate bits.

15. A processor, comprising:
  memory;
  a control unit coupled to said memory;
  an execution unit coupled to said memory to communicate data therewith, coupled to said control unit to receive direction therefrom; and
  an adder coupled to said execution unit and including:
    first and second units in a first logic layer, said first unit receiving first and second addend and augend bits and generating therefrom a first single group-carry-generate bit and first and second carry-propagate bits, said second unit receiving third and fourth addend and augend bits and generating therefrom a second single group-carry-generate bit and third and fourth carry-propagate bits, and
    a third unit in a second logic layer, coupled to said first and second units, that receives said first and second single group-carry-generate bits and said first, second, third and fourth carry-propagate bits and generates therefrom resulting group-carry-generate and group-carry-propagate bits.

16. The processor as recited in claim 15 wherein said first unit comprises a first logic gate that receives said first and second addend and augend bits and generates therefrom said first single group-carry-generate bit and said second unit comprises a second logic gate that receives said third and fourth addend and augend bits and generates therefrom said second single group-carry-generate bit.

17. The processor as recited in claim 16 wherein said first and second logic gates are threshold gates.

18. The processor as recited in claim 15 wherein said first unit comprises first and second OR gates that receive said first and second addend and augend bits and generate therefrom said first and second carry-propagate bits and said second unit comprises third and fourth OR gates that receive said third and fourth addend and augend bits and generate therefrom said third and fourth carry-propagate bits.

19. The processor as recited in claim 15 wherein said third unit comprises a third logic gate that receives said first and second single group-carry-generate bits and said third and fourth carry-propagate bits and generates therefrom said resulting group-carry-generate bit.

20. The processor as recited in claim 19 wherein said third logic gate is a threshold gate.

21. The processor as recited in claim 15 wherein said third unit comprises an AND gate that receives said first, second, third and fourth carry-propagate bits and generates therefrom said resulting group-carry-propagate bit.

22. A processor, comprising:
  memory;
  a control unit coupled to said memory;
  an execution unit coupled to said memory to communicate data therewith, coupled to said control unit to receive direction therefrom and having an adder including:
    first and second units in a first logic layer, said first unit receiving first and second addend and augend bits and generating therefrom a first single group-carry-generate bit and first and second carry-propagate bits, said second unit receiving third and fourth addend and augend bits and generating therefrom a second single group-carry-generate bit and third and fourth carry-propagate bits, and
    a third unit in a second logic layer, coupled to said first and second units, that receives said first and second single group-carry-generate bits and said first, second, third and fourth carry-propagate bits and generates therefrom resulting group-carry-generate and group-carry-propagate bits.

23. The processor as recited in claim 22 wherein said first unit comprises a first logic gate that receives said first and second addend and augend bits and generates therefrom said first single group-carry-generate bit and said second unit comprises a second logic gate that receives said third and fourth addend and augend bits and generates therefrom said second single group-carry-generate bit.

24. The processor as recited in claim 23 wherein said first and second logic gates are threshold gates.

25. The processor as recited in claim 22 wherein said first unit comprises first and second OR gates that receive said first and second addend and augend bits and generate therefrom said first and second carry-propagate bits and said second unit comprises third and fourth OR gates that receive said third and fourth addend and augend bits and generate therefrom said third and fourth carry-propagate bits.

26. The processor as recited in claim 22 wherein said third unit comprises a third logic gate that receives said first and second single group-carry-generate bits and said third and fourth carry-propagate bits and generates therefrom said resulting group-carry-generate bit.

27. The processor as recited in claim 26 wherein said third logic gate is a threshold gate.

28. The processor as recited in claim 22 wherein said third unit comprises an AND gate that receives said first, second, third and fourth carry-propagate bits and generates therefrom said resulting group-carry-propagate bit.

29. A processor, comprising:

memory;

a control unit coupled to said memory and having an adder including:

first and second units in a first logic layer, said first unit receiving first and second addend and augend bits and generating therefrom a first single group-carry-generate bit and first and second carry-propagate bits, said second unit receiving third and fourth addend and augend bits and generating therefrom a second single group-carry-generate bit and third and fourth carry-propagate bits, and a third unit in a second logic layer, coupled to said first and second units, that receives said first and second single group-carry-generate bits and said first, second, third and fourth carry-propagate bits and generates therefrom resulting group-carry-generate and group-carry-propagate bits; and an execution unit coupled to said memory to communicate data therewith, coupled to said control unit to receive direction therefrom.

30. The processor as recited in claim 29 wherein said first unit comprises a first logic gate that receives said first and second addend and augend bits and generates therefrom said first single group-carry-generate bit and said second unit comprises a second logic gate that receives said third and fourth addend and augend bits and generates therefrom said second single group-carry-generate bit.

31. The processor as recited in claim 30 wherein said first and second logic gates are threshold gates.

32. The processor as recited in claim 29 wherein said first unit comprises first and second OR gates that receive said first and second addend and augend bits and generate therefrom said first and second carry-propagate bits and said second unit comprises third and fourth OR gates that receive said third and fourth addend and augend bits and generate therefrom said third and fourth carry-propagate bits.

33. The processor as recited in claim 29 wherein said third unit comprises a third logic gate that receives said first and second single group-carry-generate bits and said third and fourth carry-propagate bits and generates therefrom said resulting group-carry-generate bit.

34. The processor as recited in claim 33 wherein said third logic gate is a threshold gate.

35. The processor as recited in claim 29 wherein said third unit comprises an AND gate that receives said first, second, third and fourth carry-propagate bits and generates therefrom said resulting group-carry-propagate bit.

* * * * *

UNITED STATES PATENT AND TRADEMARK OFFICE
CERTIFICATE OF CORRECTION

PATENT NO. : 6,438,572 B1
DATED : August 20, 2002
INVENTOR(S) : Valeriu Beiu

It is certified that error appears in the above-identified patent and that said Letters Patent is hereby corrected as shown below:

<u>Column 4,</u>
Line 39, "$H_4=(a_s \wedge b_s) \vee [(a_s \vee b_s) \vee a_t b_t]$" should be
-- $H_4=(a_s \wedge b_s) \vee [(a_s \vee b_s) \wedge a_t \wedge b_t]$ --.
Line 47, "$a_0, a_1, a_0, b_1$" should be -- $a_0, a_1, b_0, b_1$ --.

<u>Column 5,</u>
Line 48, "where "$\wedge$"" should be -- where "$\vee$" --.
Line 67, "("$\vee$")" should be -- ("$\wedge$") --.

<u>Column 6,</u>
Line 3, "$G_{2m}=G_{m:2m-1} \wedge (p_{2m-1} \vee ... \wedge p_{2m-2} \vee ... \vee p_m \vee G_{0:m-1})$" should be
-- $G_{2m}=G_{m:2m-1} \vee (p_{2m-1} \wedge p_{2m-2} \wedge ... \wedge p_m \wedge G_{0:m-1})$ --.
Line 4, "where "$\wedge$"" should be -- where "$\vee$" --.
Line 4, "and a "$\vee$"" should be -- and a "$\wedge$" --.
Line 36, "("$\wedge$")" should be -- ("$\vee$") --.

<u>Column 7,</u>
Line 43, "$F_6=g_i \vee (p_i \wedge g_{i-1}) \vee (p \wedge p_{i-1} \vee g_{i-2})$" should be
-- $F_6=g_i \vee (p_i \wedge g_{i-1}) \vee (p_i \wedge p_{i-1} \wedge g_{i-2})$ --.
Line 44, "and a "$\vee$"" should be -- and a "$\wedge$" --.
Line 49, "$F_6=sgn(5 \cdot g_i+3 \cdot p_i+2 \cdot g_{i-1}+1 \cdot p_{i-1}+1 \ g_{i-2}-4.5)$" should be
-- $F_6=sgn(5 \cdot g_i+3 \cdot p_i+2 \cdot g_{i-1}+1 \cdot p_{i-1}+1 \cdot g_{i-2}-4.5)$ --.

UNITED STATES PATENT AND TRADEMARK OFFICE
CERTIFICATE OF CORRECTION

PATENT NO. : 6,438,572 B1
DATED : August 20, 2002
INVENTOR(S) : Valeriu Beiu

It is certified that error appears in the above-identified patent and that said Letters Patent is hereby corrected as shown below:

Column 8,
Line 6, "$S_i(a_i, b_i, c_i, c_{i-1})=(a_i \wedge c_{i-1}) \vee [c_i' \wedge (a_i \vee b_i \vee c_{i-1})]$" should be
-- $S_i(a_i, b_i, c_i, c_{i-1})=(a_i \wedge b_i \wedge c_{i-1}) \vee [c_i' \wedge (a_i \vee b_i \vee c_{i-1})]$ --.

Signed and Sealed this

Eighth Day of July, 2003

JAMES E. ROGAN
*Director of the United States Patent and Trademark Office*